United States Patent
Rastegar et al.

(10) Patent No.: US 7,744,303 B2
(45) Date of Patent: Jun. 29, 2010

(54) COLLAPSIBLE CONCRETE SYSTEMS FOR RUNWAYS

(75) Inventors: Jahangir S. Rastegar, Stony Brook, NY (US); Thomas Spinelli, East Northport, NY (US)

(73) Assignee: Omnitek Partners LLC, Bay Shore, NY (US)

( * ) Notice: Subject to any disclaimer, the term of this patent is extended or adjusted under 35 U.S.C. 154(b) by 97 days.

(21) Appl. No.: 11/707,617

(22) Filed: Feb. 16, 2007

(65) Prior Publication Data
US 2007/0199268 A1 Aug. 30, 2007

Related U.S. Application Data

(60) Provisional application No. 60/775,577, filed on Feb. 21, 2006.

(51) Int. Cl.
*B64F 1/02* (2006.01)
(52) U.S. Cl. ............................ 404/10; 404/71; 188/377; 244/110 E
(58) Field of Classification Search ................... 404/10, 404/12, 13, 15, 17, 71; 188/371, 376, 377; 244/110 R, 110 E
See application file for complete search history.

(56) References Cited

U.S. PATENT DOCUMENTS

| | | | | |
|---|---|---|---|---|
| 3,066,896 | A | * | 12/1962 | Schirtzinger ............ 244/114 R |
| 5,193,764 | A | * | 3/1993 | Larratt et al. ........... 244/110 R |
| 5,885,025 | A | * | 3/1999 | Angley et al. .................. 404/27 |
| 5,902,068 | A | * | 5/1999 | Angley et al. .................. 404/34 |
| 6,685,387 | B2 | * | 2/2004 | Allen et al. .................... 404/10 |
| 6,726,400 | B1 | * | 4/2004 | Angley et al. .................. 404/27 |
| 6,969,213 | B2 | * | 11/2005 | Rastegar et al. ................ 404/11 |
| 6,971,817 | B2 | * | 12/2005 | Allen et al. .................... 404/10 |
| 7,261,490 | B2 | * | 8/2007 | Allen et al. .................... 404/34 |
| 2004/0165950 | A1 | * | 8/2004 | Rastegar et al. ............... 404/71 |
| 2008/0014019 | A1 | * | 1/2008 | Allen et al. .................... 404/71 |

* cited by examiner

*Primary Examiner*—Gary S Hartmann

(57) ABSTRACT

A collapsible concrete system for slowing a vehicle is provided. The system including: a predetermined thickness of collapsible concrete disposed over a base; and a covering disposed over a top surface of the collapsible concrete over which the vehicle travels. The covering can be a layer of non-extensible and flexible material or a plurality of interconnected panels.

5 Claims, 2 Drawing Sheets

COLLAPSIBLE CONCRETE SYSTEMS FOR RUNWAYS

CROSS-REFERENCE

This application claims the benefit of U.S. Provisional Application Ser. No. 60/775,577 filed on Feb. 21, 2006, the entire contents of which is incorporated herein by reference.

BACKGROUND

1. Field of the Invention

The present invention relates generally to emergency apparatus for use with aircraft runways, and more particularly, to collapsible concrete systems for runways.

2. Prior Art

Runway segments are typically added to the end of runways that are constructed with a special type of concrete that collapses in a more or less controlled manner under the load of an airplane tire. Such runway segments have the problem of lack of control because the collapsed concrete tends to constrain the tire to travel, more or less, in the generated "groove," making it difficult for the plane to maneuver (turn) sideways due to the resistance that the uncrushed "concrete wall" provides against the tire as it attempts to turn sideways. In addition, the concrete material cannot be formed such that it is sufficiently homogeneous to prevent bumpy rides. In addition, the collapsible concrete runway breaks up into smaller pieces that can be projected out towards the aircraft and any objects or personnel nearby, thus creating a safety hazard.

SUMMARY

Therefore, there exists a need in the art to overcome the deficiencies of the collapsible concrete systems of the prior art.

Accordingly, a collapsible concrete system for slowing a vehicle is provided. The system comprising: a predetermined thickness of collapsible concrete disposed over a base; and a covering disposed over a top surface of the collapsible concrete over which the vehicle travels.

The covering can be a layer of non-extensible and flexible material. The layer of non-extensible and flexible material can be a fabric.

The covering can be affixed to the collapsible concrete after curing of the collapsible concrete by one of an adhesive and mechanical fasteners. The covering also can be affixed to the collapsible concrete before curing of the collapsible concrete.

The covering can be a plurality of panels. The plurality of panels can be interconnected. The plurality of panels can be interconnected by a hinge to allow relative rotation about axes lateral to a direction of travel of the vehicle.

The collapsible concrete can be disposed over the base adjacent an aircraft runway.

Also provided is a method for slowing a vehicle. The method comprising: providing a predetermined thickness of collapsible concrete disposed over a base; and disposing a covering over a top surface of the collapsible concrete over which the vehicle travels.

The disposing can comprise affixing the covering to the collapsible concrete after curing of the collapsible concrete. The disposing can comprise affixing the covering to the collapsible concrete before curing of the collapsible concrete.

Still further provided is a collapsible concrete system for slowing an aircraft. The system comprising: collapsible concrete disposed over a base adjacent a runway for landing the aircraft; and a plurality of interconnected panels disposed over a top surface of the collapsible concrete over which the aircraft travels.

The plurality of panels can be interconnected by a hinge to allow relative rotation about axes lateral to a direction of travel of the aircraft.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION

Although this invention is applicable to numerous and various types of roadways and surfaces, it has been found particularly useful in the environment of runways for aircraft. Therefore, without limiting the applicability of the invention to runways for aircraft, the invention will be described in such environment. Those skilled in the art will appreciate that the collapsible concrete systems of the present invention can be used on roadways for automobiles and trucks and for other wheeled vehicles.

Figure 1:
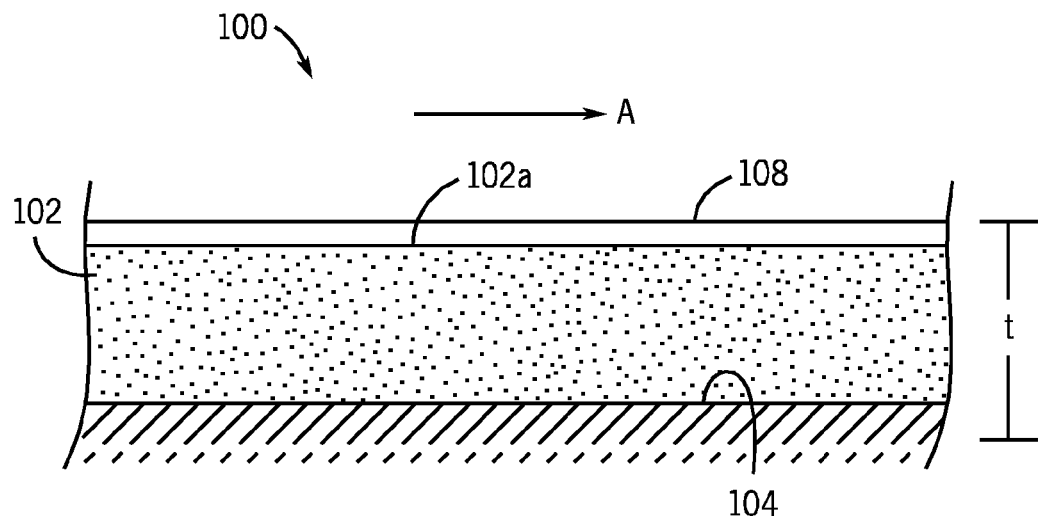
FIG. 1 illustrates a sectional side view of a first embodiment of a collapsible concrete system.

Referring now to FIG. 1, there is shown a first embodiment of a collapsible concrete system, generally referred to by reference numeral 100. The collapsible concrete system 100 has a predetermined thickness t of collapsible concrete 102 over a base 104. The fabrication of collapsible concrete and the proper thickness for the same for different applications is well known in the art. Generally, the collapsible concrete can be provided in blocks and stacked along the base 104 to cover an appropriate portion of the base. The collapsible concrete system 100 further has a covering 108 which covers at least a portion of a top surface 102a of the collapsible concrete 102. The top surface 102a being the surface over which the vehicle's wheel will travel if not for the covering 108. The covering 108 can be a layer of relatively non-extensible but flexible material, such as fabric or other similar material to allow a relative continuous deformation of the collapsible concrete as a vehicle's wheel passes over the same. The covering 108 can be affixed to the collapsible concrete after fabrication thereof, by any methods known in the art, such as with adhesive or mechanical fasteners. Alternatively, the covering 102 can be fabricated together with the collapsible concrete, such as being disposed on the top surface 102a prior to the collapsible concrete being fully cured so that the collapsible concrete "fuses" or "intermingles" with the covering 108. The covering 102 allows the collapsible concrete 102 to collapse under the weight of a vehicle's wheel yet acts to prevent and debris from being throw outward towards the vehicle, other objects or personnel.

Figure 2:
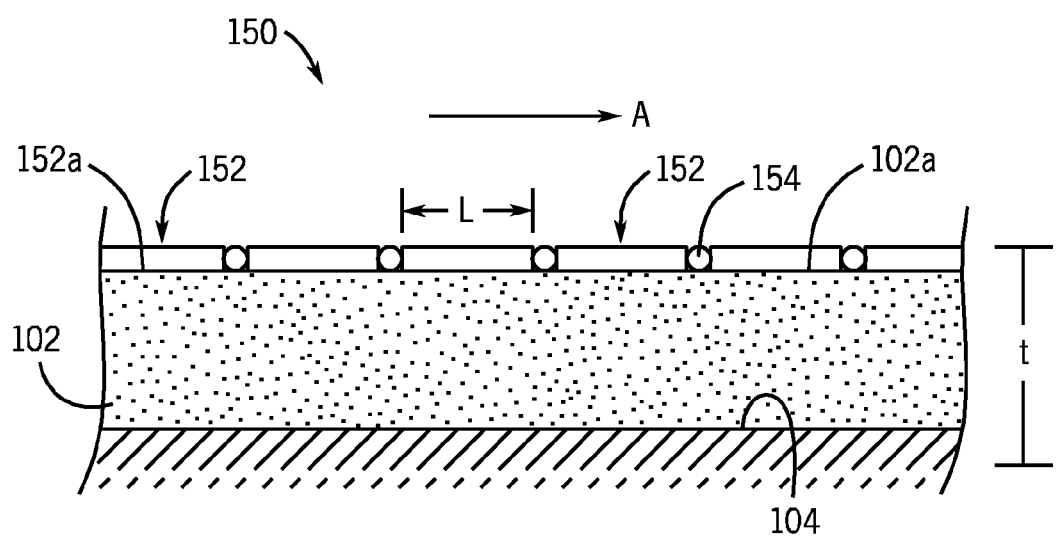
FIG. 2 illustrates a sectional side view of a second embodiment of a collapsible concrete system.

A second embodiment of a collapsible concrete system will now be described with reference to FIGS. 2-5 in which like reference numerals denote like features from FIG. 1. Referring now specifically to FIG. 2, there is shown the second embodiment of the collapsible concrete system, generally referred to by reference numeral 150. The collapsible concrete system 150 has a predetermined thickness t of collapsible concrete 102 over a base 104. The collapsible concrete collapsible concrete system 150 further has relatively rigid panels 152, which can be separate from each other or interconnected, such as by a hinge 154 to allow relative rotation about axes lateral to the direction of travel (A) to allow the panels 152 to assume a sloped configuration as the vehicle wheel 156 rolls over a panel and to push the entering edge 152a down. The hinges 154 can also allow certain amount of relative displacement between the panels 152 in the direction of travel A to accommodate the rotation and downward motion of one panel 152 relative to the next panel (in the direction of travel A) as the wheel 156 of the vehicle rolls over one panel 152. The length (L) of the panels 152 is chosen depending on the size of the typical wheel that will use the system (or a range of wheel sizes). The width of the panels 152 (perpendicular to the direction of travel A) can vary from the width of the wheel 156 (and perhaps even smaller) to the width of the runway, however, in general, the wider the panel the more kinetic energy of the vehicle will be used to crush the collapsible concrete 102.

Figure 3:
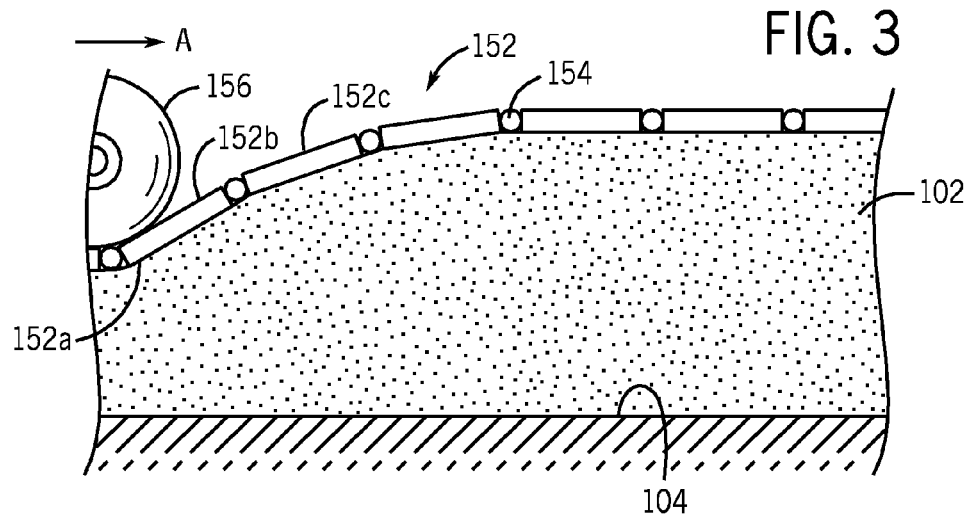
FIGS. 3-5 illustrate the second embodiment of a collapsible concrete system showing a sequence of a vehicle's wheel as it travels over the collapsible concrete system.
Figure 4:
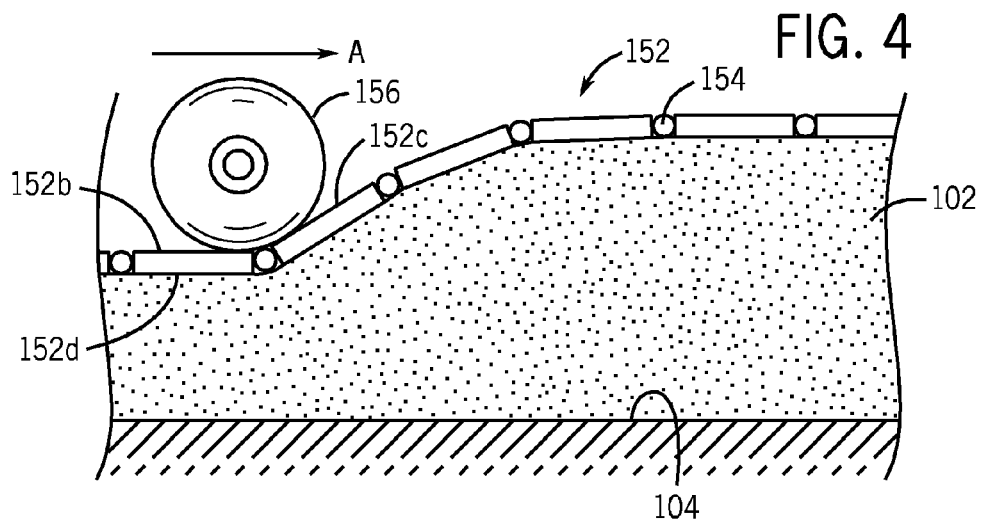
Figure 5:
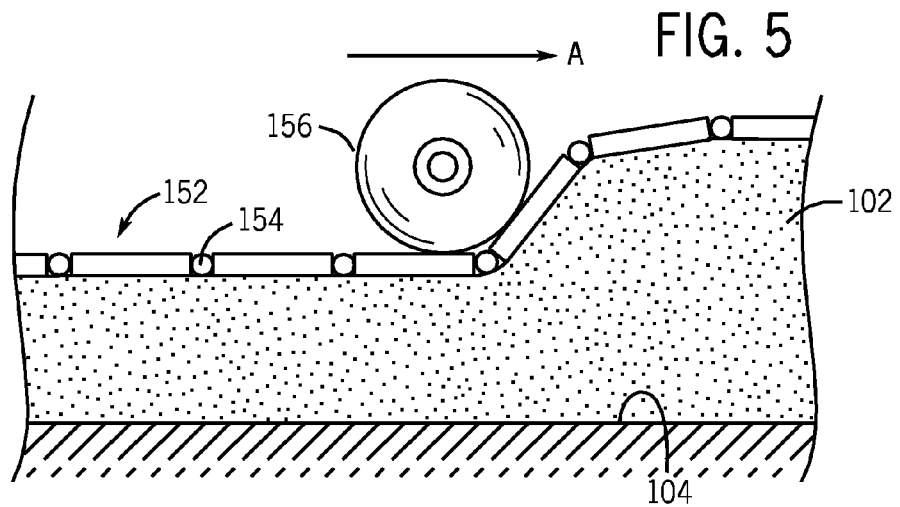

The resulting runway section having the collapsible concrete system 150 will then act very similar to the runway system described in U.S. Pat. No. 6,969,213 entitled "Roadway for Decelerating a vehicle Including an Aircraft," the entire contents of which is incorporated herein by reference. In the present collapsible concrete system, 150, the collapsible concrete 102 is used in place of the support and control elements disclosed in U.S. Pat. No. 6,969,213. The difference is the kinetic energy of the vehicle is used to crush the concrete rather than being stored in springs or absorbed by dampers or brake elements. Thus, as shown in FIG. 2, as a vehicle wheel 156 enters the collapsible concrete system 150, the entering edge 152a will be pushed down towards the base 104 causing the rest of the panel 152b to incline as shown in FIG. 3. The next panel 152c, being connected by the hinges 154, may also be pulled slightly downward. Referring now to FIG. 4, as the wheel 156 travels to the other end 152d of the panel 150b the concrete under such panel is collapsed thereby using the kinetic energy of the vehicle (i.e., converting such kinetic energy to energy to crush the concrete) resulting in a slowing of the vehicle. The wheel 156 then contacts the leading edge 152a of the next panel 152c and the process repeats. FIG. 5 illustrates the panels 150 as the wheel has traveled a substantial distance in the direction of travel A in which several panels upstream of the vehicle are depressed and the collapsible concrete associated therewith is collapsed (crushed). In addition to the panels 150 preventing debris from being throw, another advantage of using such panels 150 over collapsible concrete 102 is that the vehicle travels much smoother since it would average out the strength of the collapsible concrete, the homogeneity of which is hard to control. Still another advantage of the collapsible concrete system 150 is that there is no resulting loss of control of the vehicle as it travels over the panels 150.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A collapsible concrete system for slowing a vehicle, the system comprising:
    a predetermined thickness of collapsible concrete disposed over a base; and
    a covering disposed over a top surface of the collapsible concrete over which the vehicle travels, the covering comprising a plurality of panels, two or more of which being interconnected by a hinge.

2. The collapsible concrete system of claim 1, wherein the plurality of panels are each interconnected by a hinge to allow relative rotation about axes lateral to a direction of travel of the vehicle.

3. The collapsible concrete system of claim 1, wherein the collapsible concrete is disposed over the base adjacent an aircraft runway.

4. A method for slowing a vehicle, the method comprising:
    providing a predetermined thickness of collapsible concrete disposed over a base;
    disposing a plurality of panels over a top surface of the collapsible concrete over which the vehicle travels; and
    interconnecting two or more of the plurality of panels together with a hinge.

5. A collapsible concrete system for slowing an aircraft, the system comprising:
    collapsible concrete disposed over a base adjacent a runway for landing the aircraft; and
    a plurality of panels disposed over a top surface of the collapsible concrete over which the aircraft travels;
    wherein two or more of the plurality of panels are interconnected by a hinge to allow relative rotation about axes lateral to a direction of travel of the aircraft.

* * * * *